United States Patent [19]

Miller et al.

[11] Patent Number: 4,601,194
[45] Date of Patent: Jul. 22, 1986

[54] METHOD AND APPARATUS FOR LEAK TESTING OF PIPE

[75] Inventors: Ronnie F. Miller; Arthur L. Dwyer; Darwin A. Miller; Darwin L. Miller, all of Houma, La.

[73] Assignee: Damco Testers, Inc., Houma, La.

[21] Appl. No.: 571,823

[22] Filed: Jan. 18, 1984

Related U.S. Application Data

[63] Continuation-in-part of Ser. No. 458,790, Jan. 18, 1983, abandoned.

[51] Int. Cl.⁴ ............................................. G01M 3/20
[52] U.S. Cl. ........................................... 73/40.7; 73/46
[58] Field of Search ................... 73/40.7, 40.5 R, 46, 73/49.1

[56] References Cited

U.S. PATENT DOCUMENTS

| 2,703,978 | 3/1955 | Baxter | 73/40.7 |
|---|---|---|---|
| 2,706,398 | 4/1955 | Davidson | 73/40.7 |
| 3,151,478 | 10/1964 | Heldenbrand | 73/49.2 |
| 3,165,920 | 1/1965 | Loomis | 73/40.5 R |
| 3,385,103 | 5/1968 | Wilkerson | 73/45.5 |
| 3,592,048 | 7/1971 | Maurice et al. | 73/40.7 |
| 3,899,920 | 8/1975 | Matherne | 73/40.5 R |
| 4,080,822 | 3/1978 | Stenback | 73/40.7 |
| 4,081,990 | 4/1978 | Chatagnier | 73/40.5 R |
| 4,152,926 | 5/1979 | Hasha | 73/46 |
| 4,158,960 | 6/1979 | White et al. | 73/40.7 |
| 4,282,743 | 8/1981 | Pickett | 73/46 |
| 4,429,566 | 2/1974 | Armell et al. | 73/40.7 |

FOREIGN PATENT DOCUMENTS

| 2304911 | 10/1976 | France | 73/40.7 |
|---|---|---|---|
| 2055210A | 2/1981 | United Kingdom | 73/40.7 |
| 2056091A | 3/1981 | United Kingdom | 73/40.7 |

*Primary Examiner*—Stewart J. Levy
*Assistant Examiner*—Hezron E. Williams
*Attorney, Agent, or Firm*—Fleit, Jacobson, Cohn & Price

[57] ABSTRACT

A method of testing pipe sections at an oil rig floor by means of an internal pipe testing tool and a pressurized gas containing helium in a ratio of helium to a carrier gas of at least about 1:2856 by volume. The gas is pressurized in a hydraulic accumulator remote from the rig floor. The pressurized gas actuates the test tool at substantially the same pressure as is used for testing the pipe section. A flexible enclosure confines the test gas which leaks from the pipe section. The enclosure defines a substantially annular chamber around the area to be tested to confine leakage test gas to prevent its dissipation into the atmosphere. An aperture is provided in the enclosure to permit a sensing probe to be inserted into the annular chamber between the enclosure and the pipe section to sense the presence of test gas.

8 Claims, 8 Drawing Figures

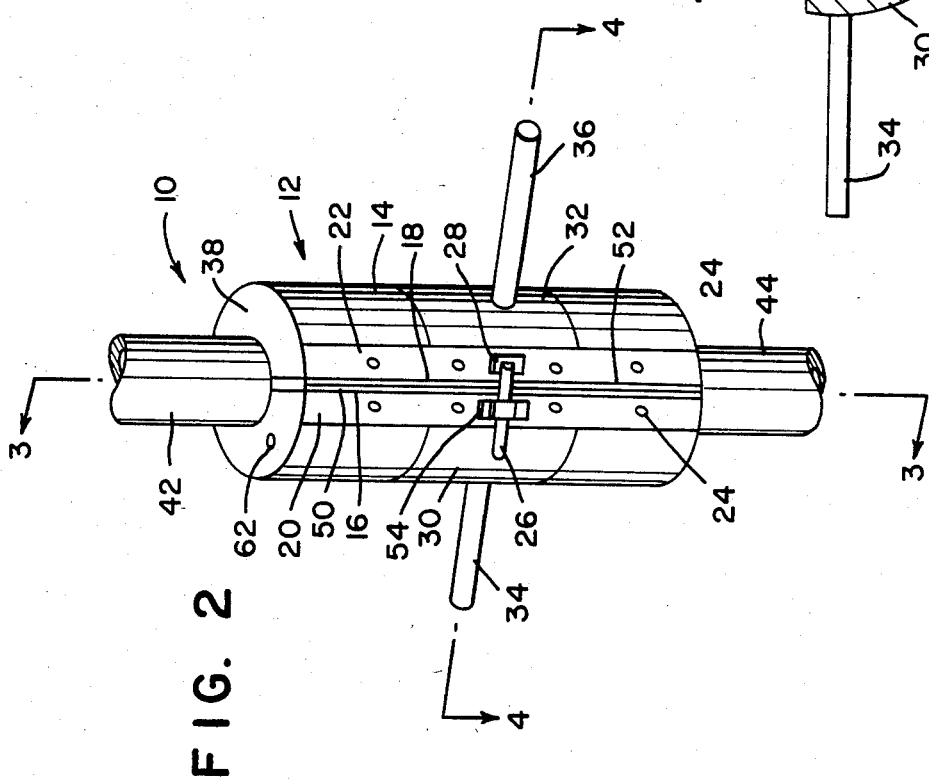
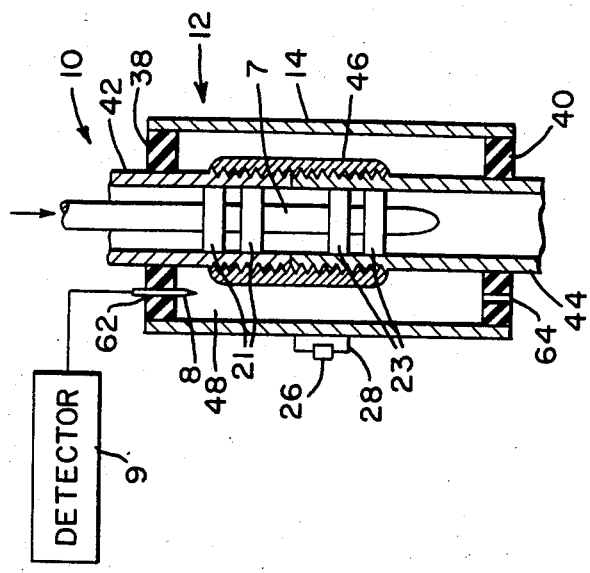
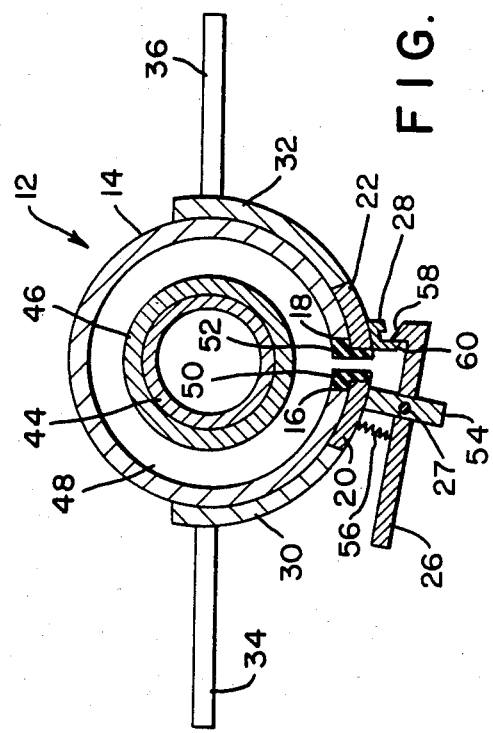

METHOD AND APPARATUS FOR LEAK TESTING OF PIPE

CROSS-REFERENCE TO RELATED APPLICATION

This application is a continuation-in-part of copending application Ser. No. 458,790, filed Jan. 18, 1983, now abandoned.

BACKGROUND OF THE INVENTION

This invention relates to leak testing of pipe sections by means of a pressurized test gas, and more particularly to a method and apparatus for testing for minute leakage at a test section and including an enclosure device for confining any test gas that leaks through the test section.

The testing of fluid conduits for leak tightness is a common requirement, especially in the oil and gas well field. In the oil field, the testing of pipe joints is especially important to prevent leakage of the gas or oil out of the pipe and loss into the surrounding ground around the bore hole. Typically in such applications, a hole is drilled in the earth, and as the depth of the hole increases a well casing, in the form of a pipe, is inserted behind the drill to define the well bore and to permit the introduction and withdrawal of drilling fluids, as well as the withdrawal of drilling debris. Several sections of such a well casing when connected together are referred to as a well string, and the string is defined by a series of interconnected pipe sections, the interconnections most often being accomplished by means of an internally threaded union which engages corresponding external threads at each of the opposed ends of the pipe sections to be joined.

Testing of such pipe joints for leak tightness has most often been accomplished by subjecting the pipe joint to high internal fluid pressures. A suitable pipe testing tool is introduced into the interior of the pipe, the tool being such that it includes spaced resilient packing glands which are radially extendable against the interior surface of the pipe on opposite sides of the area to be tested to thereby define an annular space into which a pressurized liquid, such as water, can be introduced. An example of a highly preferred pipe testing tool is shown in U.S. Pat. No. 4,548,069, issued Oct. 22, 1985, entitled "Pipe Testing Tool", and owned by the same assignee, the disclosure of which application is incorporated herein by reference. Alternate tools are shown in U.S. Pat. No. 3,899,920. Any leakage of water through the joint can then be visually detected, whereupon suitable corrective action can be taken.

In addition to the use of pressurized water, it has become accepted practice when testing pipe for deeper wells to employ pressurized gas or gases, especially nitrogen gas, to check pipe joints for leak tightness. This is particularly true for testing leak tightness at pressures in excess of about 10,000 psi. A similar pipe testing tool is employed to introduce the pressurized gas to the interior of the pipe (see, for example, the aforesaid U.S. Pat. No. 4,548,069, and a liquid film is applied to the outside surfaces of the joint in order to visually observe leaking gas bubbles.

Alternatively, when pressurized nitrogen gas has been used in the testing tool, a cup-like member was positioned around and under the exterior of the joint section to be tested, and tightly engaged the section of pipe immediately below the test section to define an external annular chamber open at the top and closed at the bottom. Water was placed in the annular chamber, and a leak site manifested itself by the appearance of nitrogen bubbles rising in the surrounding water, which can be visually detected. An example of such a "bubble bucket" is shown in U.S. Pat. No. 3,385,103, issued May 28, 1968, to John F. Wilkerson.

Nitrogen gas has limitations with respect to the size of leak sites which can be detected and the speed with which nitrogen gas can disclose the existence of very small leak passages. As well known in the art, the speed by which a leak is detected is very important in the oil field inasmuch as the time necessary to make the test is lost and cannot be recovered in the drilling operations. Hence, time saved in conducting the test is time and money saved in drilling the well.

Another method, not used in the oil field, for checking for small leaks in pipe connections involves the use of a pressurized gas, the escape of which is sensed by a suitable sensing probe. The output of the sensing probe, which will detect minute quantities of the gas, is then displayed on a meter, screen, or the like. However, because of possible dissipation into the atmosphere by air currents, minute amounts of leakage gas could easily escape detection. A suitable enclosure has been disclosed to surround the test section and thereby prevent dissipation into the atmosphere of the test gas which leaks through the joint. An example of one form of enclosure to accomplish that purpose is shown and described in U.S. Pat. No. 4,282,743, which issued Aug. 11, 1981, to Patrick T. Pickett. However, the Pickett enclosure is not used in conjunction with an internal tool to introduce the gas and seal off the section to be tested, and the fitting arrangement disclosed in the Pickett patent is a two-piece structure which must be carefully assembled around the section to be tested and thus is too cumbersome to use in the oil field.

It is therefore desirable to provide an improved method and apparatus for pressurized testing of oil field pipe using a gas mixture that can pass through extremely small leak sites, which are too small to pass pure nitrogen gas, and which can be detected much more rapidly than pure nitrogen through leak sites that pass nitrogen but only at a slow rate.

In addition to providing an improved test gas mixture, it is also desirable that an improved leak test enclosure and pressurizing system be provided for use in conjunction with an appropriate internal pipe testing tool, wherein the pressurizing system permits pressurization of the test gas to high pressures while minimizing dangerous risks on the rig floor previously encountered and the enclosure is more convenient to use and can rapidly be applied to and removed from the pipe connection to be tested.

SUMMARY OF THE INVENTION

It is the principal object of the present invention to provide an improved apparatus and method of testing pipe sections for leakage using a test gas mixture that can rapidly pass through extremely small leak sites to permit rapid leak detection.

It is another principal object of the present invention to provide a unique leak test enclosure for use in conjunction with an appropriate internal pipe testing tool for sensing the leaking gas or the gas mixture A further object of the present invention is to provide a leak test enclosure which is flexible and removable and can be quickly positioned about a test section.

Still a further object of the present invention is to provide a leak test enclosure which is readily positioned about and removed from a pipe test section under test using an appropriate internal pipe testing tool, which can accommodate different size pipe diameters without the need for adjustment, and which completely encloses the pipe section for rapid detection of leakage gas that is present in the interior of the pipe section being tested.

Yet another object of the present invention is to provide a unique system for pressurizing the test gas mixture in combination with an appropriate internal pipe testing tool whereby the tool is activated and set in the pipe section to be tested at substantially the same pressure as the pressure of the test mixture used in testing the pipe section.

Briefly stated, in accordance with the principal aspect of the present invention, a method of testing pipe for leakage is provided wherein a test gas in the form of a gaseous mixture of helium and a carrier gas is introduced at the test section by an appropriate internal pipe testing tool. The internal pipe testing tool used in the instant invention relies upon a single source of high pressure gas both to set the tool inside the pipe section to be tested and to exit the tool and test the pipe section (see U.S. Pat. No. 4,548,069). The test gas must contain a detectable percentage of helium so that its escape through very small leak sites can be detected. A ratio of helium to carrier gas greater than at least about 1:10 by volume has been found preferred. The internal tool and pipe section are both pressurized with the test gas to substantially the same internal pressure of from about 3000 psi to about 20,000 psi and the presence of leakage of the helium gas at the test section is sensed.

In another aspect of the invention, improved pressurizing apparatus is provided together with an enclosure for confining adjacent to the test section the test gas that has leaked through the test section. The enclosure comprises a unitary, substantially gas impermeable flexible body having a pair of spaced open ends defined by resilient, substantially gas impermeable end sealing means to close the ends of the body portion when the enclosure is assembled in substantially fluid-tight engagement with the exterior of the pipe around the section to be tested. Closing means carried by the enclosure are provided to permit the body to define a chamber around the test section to confine the test gas therewithin.

In another embodiment of the invention, the enclosure is provided in the form of a flexible sheet which includes longitudinally spaced stiffener members that serve to space the enclosure from the outer periphery of the test section and provide a chamber therearound.

BRIEF DESCRIPTION OF THE DRAWINGS

FIG. 2 is a fragmentary perspective view of a pipe section including one form of leak test enclosure in accordance with the present invention.

FIG. 3 is a longitudinal cross-sectional view taken along the line 3—3 of FIG. 2.

FIG. 4 is a transverse cross-sectional view taken along the line 4—4 of FIG. 2.

DESCRIPTION OF THE PREFERRED EMBODIMENTS

Figure 1:
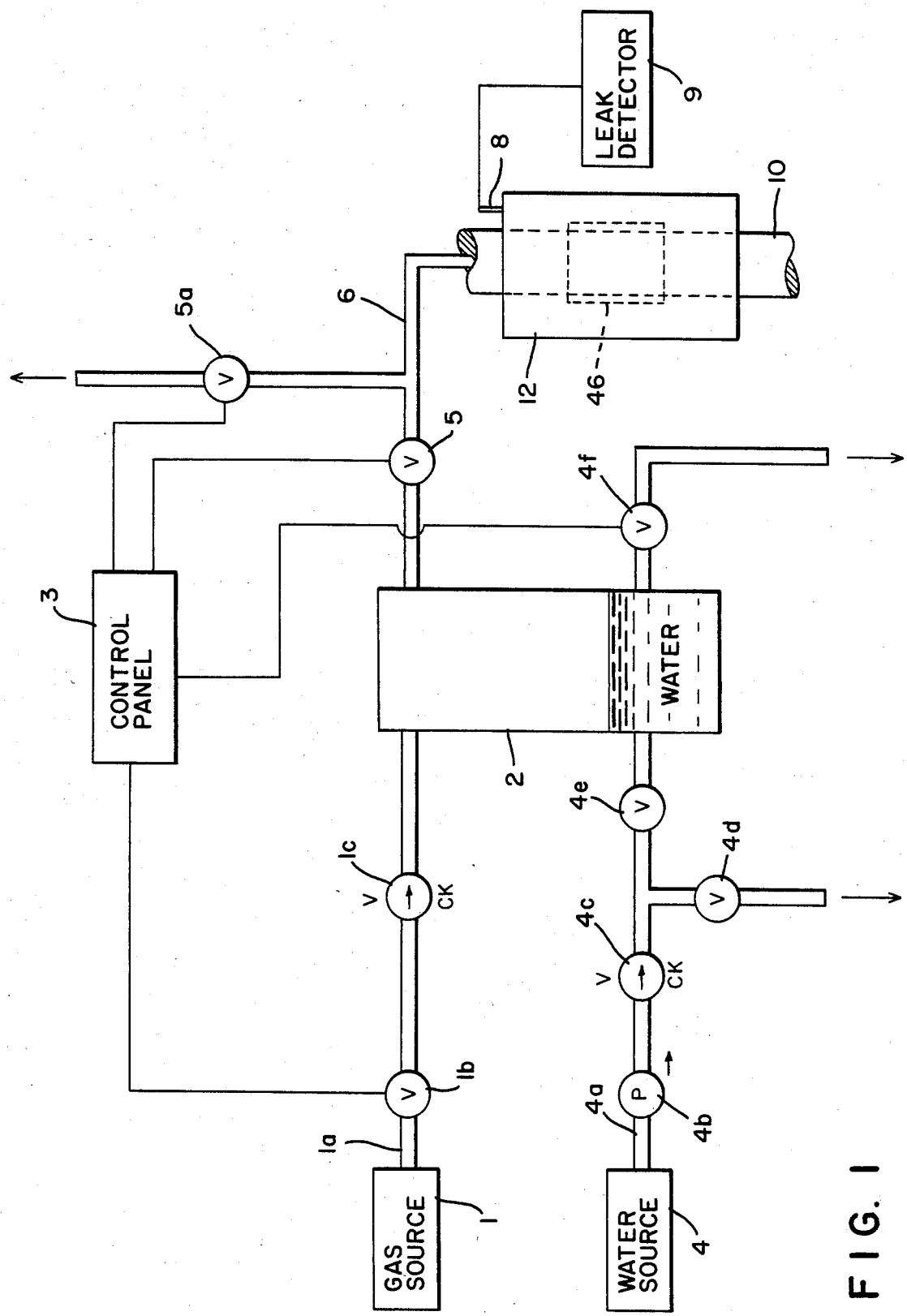
FIG. 1 is a schematic view showing gas pressurization and leak detection apparatus for testing the leak tightness of pipe joints in accordance with the present invention.

Referring now to the drawings, and particularly to FIG. 1 thereof, there is shown a section of pipe 10, a portion of which is surrounded by one form of leak test enclosure 12 in accordance with the present invention. The pipe section includes a joint or union 46 by which two portions of pipe are joined together. A detection probe 8 is provided to detect leakage of test gas that is fed under pressure into pipe section 10. The probe is connected to a gas detector 9 to provide either a visual or other convenient indication of leakage of the test gas from inside the pipe section through the joint and into enclosure 12. One type of suitable gas detector that can be used to detect leakage of the test gas is a GOW-MAC Gas Leak Detector, Model No. 21-250, Manufactured by GOW-MAC Instrument Co., Bridgewater, N.J.

The test gas, the composition of which will be described hereinafter in more detail, is provided from a gas source 1 to an accumulator 2, in the form of a pressure vessel, through a pipe 1a, a remotely controlled gas fill valve 1b, and a check valve 1c. Fill valve 1b can be pneumatically or electrically operated from a remote control panel 3 to permit the test gas to enter the accumulator until pressure equilibrium with the gas source takes place, which can be, for example, at a pressure of from about 400 psi to about 1000 psi. Additional pressurization of the gas to the desired test pressure, which can be of the order of about 10,000 psi or more, is obtained by introducing a pressurized liquid, such as water, into the lower portion of accumulator 2 from a water source 4, through pipe 4a, by means of pump 4b. A check valve 4c is provided to prevent backflow and a manually operated relief valve 4d is provided. An isolation valve 4e is provided in the event repairs are desired to be made upstream of valve 4c without relieving the pressure in accumulator 2. A relief valve 4f remotely operated from control panel 3 is provided to permit bleed-off of water, and consequent reduction of pressure, after a pressure test has been completed.

After pressurization of the test gas in accumulator 2 to the desired test pressure, a gas supply valve 5 is remotely operated from control panel 3 to admit pressurized test gas into pipe 6 that is connected with test tool 7 (see FIG. 3) positioned within the pipe. Any temporary reduction in pressure is eliminated by pumping more water into the accumulator. In the form of test tool used in accordance with the present invention, only a single source of pressurized gas is fed to the test tool. The pressurized gas sets the seals of the test tool against the internal wall of the pipe to define the section to be tested. At the same time, the pressurized gas exits from the tool into the annular space between the outside of the tool ard inside of the pipe section under test as defined by set seals. As a result, the pressurized gas which sets the seals of the test tool and the pressurized gas which tests the pipe section for leaks are substantially the same pressure.

After the test has been completed, the relief valves 4d and 4f are opened and the compressed gas in the test tool forces the water, or other hydraulic fluid, back out of the accumulator. These valves remain open until gas starts to escape, after which they are closed. The gas supply valve 5 is also closed, thus trapping most of the gas in the accumulator. The remote atmosphere gas bleed off valve 5a is then opened to allow any gas trapped between the accumulator and the test tool to escape. It is then closed and the cycle can start again.

By this hydraulic system of pressurization of the test gas, the accumulator can be located at a position remote from the rig floor and the control panel. Thus, the control panel can be operated at the rig floor but the sometimes dangerous accumulator can be located where any rupture or breakage due to high pressures will not cause any injury.

As shown in FIG. 2, enclosure 12 includes a generally tubular body 14 which is split longitudinally to define a pair of opposed longitudinal edges 16, 18. Adjacent each of longitudinal edges 16, 18 is a stiffener bar 20, 22, respectively, which can be secured thereto by means of bolts 24, or the like. Stiffener bars 20, 22 each include one element of a locking bar arrangement, stiffener 20 carrying a notched locking bar 26, and stiffener 22 carrying a notched retainer 28, the arrangement and operation of which will hereinafter be described in more detail. Positioned circumferentially about the outer periphery of the body and suitably secured to stiffener bars 20, 22 are a pair of arcuate handle supports 30, 32, respectively, which extend for approximately 90° of arc in opposite directions around tubular body 14. Extending outwardly from each of handle supports 30, 32 is a spreader handle 34, 36, respectively, each of which preferably is positioned on opposite sides of body 14 to facilitate the separation and spreading of longitudinal edges 16, 18.

Each of the ends of tubular body 14 includes a transversely extending, inwardly directed, resilient seal 38, 40 (only one of which is visible in FIG. 2), that is adapted to sealingly enage the outer surfaces of the pipe sections 42, 44 which are joined by union 46 (see FIGS. 3 and 4), and provide a seal between the respective pipes adjacent the joint and tubular body 14 to prevent dissipation of any test gas that leaks into the annular chamber 48 therebetween. Seals 38, 40 are of generally annular conformation. Flexible seals 50, 52 are positioned along each of longitudinal edges 16, 18, respectively, to assist in preventing the dissipation of any test gas that leaks into annular chamber 48 Although two seals 50, 52 are shown, it is not essential that two seals be used, and a single seal secured to either of longitudinal edges 16 or 18 can be employed, if desired.

The locking means for holding seals 50, 52 in sealing engagement is most clearly seen in FIG. 4. Notched retainer 28 is positioned on longitudinal stiffener 22 intermediate the ends thereof. Locking bar 26 is pivotally secured to a yoke member 54 which is, in turn, secured to longitudinal stiffener 20 intermediate the ends thereof. Biasing means, such as spring 56, is provided and bears against locking bar 26 outwardly of the pivot 27 to urge the notch thereof toward notched retainer 28. As can be seen in FIG. 4, locking bar 26 and retainer 28 have cooperable notched edges 58, 60, respectively, which are so positioned relative to each other that longitudinal edges 16, 18, respectively, are held in tight engagement when the locking means is engaged.

As best seen in FIG. 3, a typical pipe joint includes a threaded union 46 which engages corresponding external threads on each of adjacent pipe sections 42, 44, and defines part of the inner surface of annular chamber 48. Internal test tool 7 is positioned within the pipe adjacent the joint section to be tested, with upper seal or seals 21 above the joint and lower seal or seals 23 below. Prior to pressurizing the tool, the outside diameter of the seals 21 and 23 are sufficiently smaller than the internal diameter of the pipe of allow the tool to traverse easily therein. Upon pressurization, the seals expand to engage the internal diameter of the pipe and seal the section to be tested, all as fully described in U.S. Pat. No. 4,548,069.

Also provided in tubular body 14 are a probe aperture 62 through which a suitable sensing probe 8 can be inserted in order to sense the presence of leakage gas that flows from a defective joint into annular chamber 48. Additionally, a small vent aperture 64 can be provided to permit the inflow of a small amount of air to replace the gas sample that is withdrawn by the sensing probe. Vent aperture 64 prevents the formation of a slight vacuum, which could otherwise develop if the gas withdrawn through the sensing probe is not replaced by a corresponding volume of air.

Tubular body 14 is preferably formed from a substantially gas impermeable material which is sufficiently flexible to permit the opening of the slot defined by longitudinal edges 16, 18 and at the same time sufficiently resilient to permit enclosure 12 to assume its original shape when the spreading force for opening the slot are relaxed. Suitable materials include flexible sheet metal, or plastics, such as tubular polyurethane, polyvinyl chloride, or the like.

In operation, union 46 is threadedly secured to an end of the pipe section 44, and an end of pipe section 42 is threadedly engaged with the upper portion of union 46 to define a complete joint. Thereupon test enclosure 12 of the present invention is positioned about union 46 by spreading handles 34 and 36 until longitudinal edges 16 and 18 are separated a distance sufficient to permit the enclosure to be placed over the pipe section. Once enclosure 12 is in position, the spreading forces on handles 34 and 36 are released, and the resilience of tubular body 14 causes longitudinal edges 16 and 18 to move close to each other. Closing forces are then applied to spreader handles 34 and 36 to bring edges 16 and 18 together so that seals 50 and 52 are in sealing engagement. The locking means is actuated by continued closing pressure on the spreader handles until a point is reached where the notches 58 and 60 on locking bar 26 and notch retainer 28, respectively, are engaged by the action of biasing spring 56. Thereafter the closing forces on spreader handles 34 and 36 are released and the locking means maintains the enclosure in a closed condition.

After the enclosure is properly positioned around the joint, the interior pipe 10 adjacent the joint is pressurized by means of a high pressure test gas. Preferably, the test gas includes at least about 9% by volume helium. If the joint is gas-tight, none of the pressurized test gas will leak into annular chamber 48 between the pipe joint and the enclosure. If a leak exists, then pressurizing gas including a tracer (preferably helium) will leak into annular chamber 48 and the sensing probe inserted through probe aperture 62 will detect the presence of the tracer gas by withdrawing a portion of the gas in the annular space for analysis by a spectrophotometer, or by another suitable sensing device capable of detecting and indicating the presence of the tracer gas. The withdrawn gas sample can be replaced by air which is permitted to enter the enclosure through vent aperture 64.

Figure 6:
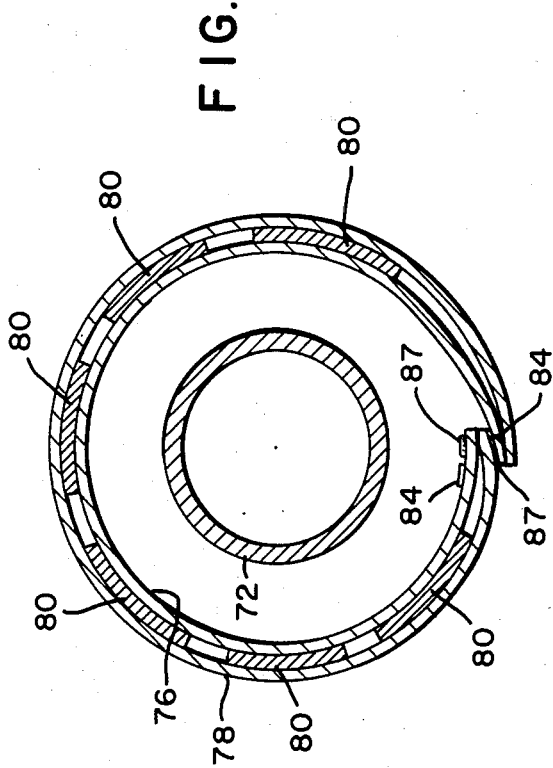
FIG. 6 is a transverse cross-sectional view taken along the line 6—6 of FIG. 5.
Figure 7:
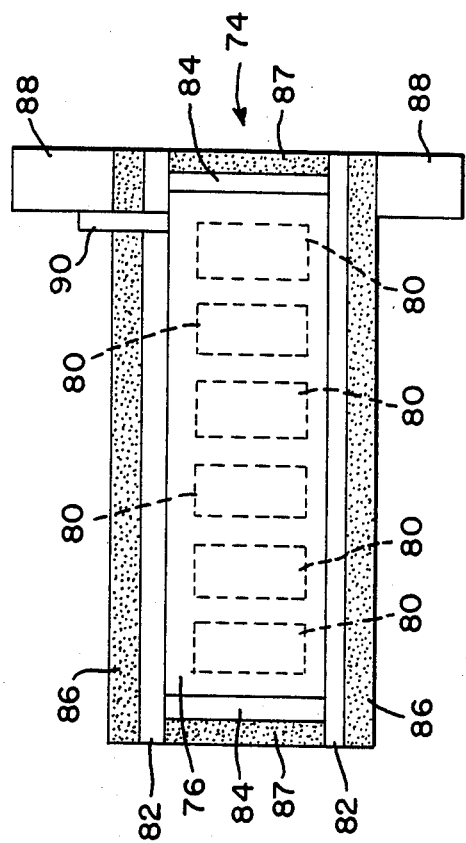
FIG. 7 is a plan view of the enclosure shown in FIG. 5 after the same has been removed from the pipe and has been fully opened.
Figure 5:
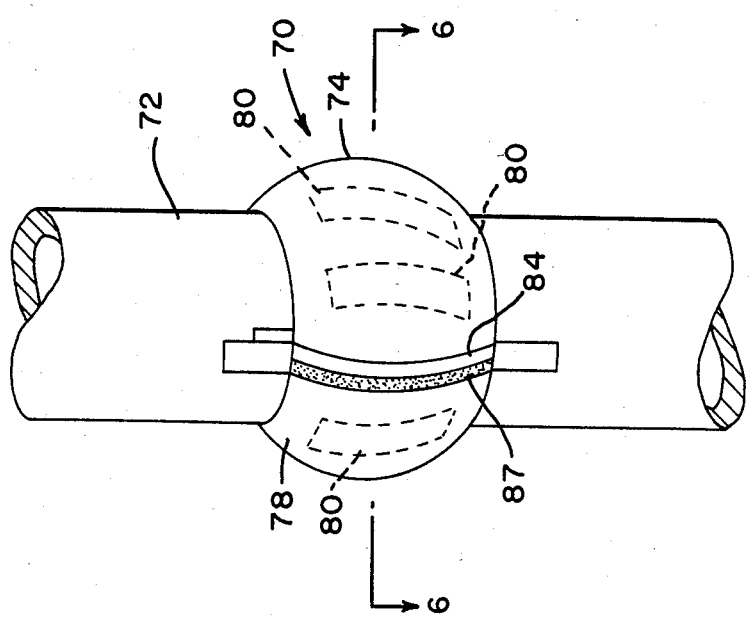
FIG. 5 is a fragmentary perspective view of a pipe joint section including another form of leak test enclosure in accordance with the present invention.

Another embodiment of the enclosure is illustrated in FIGS. 5–7, inclusive, which provides another form of enclosure 70 positioned about a pipe 72 and which functions in a manner similar to the embodiment of FIGS. 2–4, inclusive. Structurally, however, enclosure 70 is provided as a flexible wrap 74 that is adapted to be wrapped around pipe 72. Wrap 74 includes an inner face 76, an outer face 78, and a plurality of longitudinally spaced, arcuate stiffener members 80 positioned to provide body to the wrap so that when it is wrapped around a test section, stiffeners 80 will prevent the complete inward collapse of wrap 74 and will cause substantial inner portions thereof to be spaced from the outer periphery of pipe 72 a sufficient distance to define an enclosed chamber into which a sensing probe (not shown) can be inserted. Although shown in FIGS. 5 and 6 as positioned between inner face 76 and outer face 78, stiffeners 80 can also be positioned directly on either of those faces, if desired, so long as they are capable of spacing a portion of the wrap from the outer surface of pipe 72.

As shown in FIG. 7, wrap 74 is of generally rectangular configuration, with the major dimension thereof arranged around the outer surface of pipe 72 as shown in FIG. 5. A pair of resilient longitudinal seals 82, which can be solid or foamed rubber or plastics, is positioned at inner surface 76 parallel to and spaced inwardly of the longer edges of wrap 74, and similar seals 84 are positioned along the shorter edges thereof on both faces of the wrap to permit either shorter edge thereof to overlie the other when the wrap is installed for use.

Positioned along each of the longer edges and outwardly of each of seals 82 is a separable connecting means to permit removable engagement of portions of the longitudinal edges when the same are in overlapped condition. A suitable connecting means is a pair of cooperating strips 86 of material known as "Velcro" which on one surface consists of a series of loop-type elements, and on the opposed, engaging surface it includes a plurality of outwardly extending, hook-like elements. Similar separable connecting means 87 are provided at the edges of the wrap.

Also positioned on flexible wrap 74 and preferably at one pair of adjacent corners thereof are tabs 88 to provide a gripping means to facilitate the installation of the device around pipe 72 and to permit the respective longitudinal edges thereof to be drawn into tight engagement with the pipe outer surface to prevent dissipation of test gas by wind or other external air currents.

Suitable sheet materials for forming the flexible wrap are plastic films or other substantially gas impermeable materials, a pair of which can be sealed or otherwise joined along their marginal edges to provide inner face 76 and outer face 78 and within which stiffener members 80 can be positioned. A suitable plastic film is polyvinyl chloride. Stiffeners 80, which are of curved shape, are preferably positioned in longitudinally spaced relationship along wrap 74 and can be formed from any rigid yet resilient materials, such as sections of plastic tubing having sufficient thickness to provide rigidity. The several stiffeners can be retained in spaced pockets (not shown) formed between the inner and outer faces of the wrap. Additionally, stiffeners 80 can also be secured to the inner or outer faces of wrap 74, if desired.

The wrap of FIG. 7 is shown installed for use on a section of pipe in FIGS. 5 and 6, wherein the longitudinal edges are shown to be in peripheral contact with the outer surface of pipe 72. As in the embodiment of FIGS. 2 to 4, a sensing probe aperture 90 is provided and can be in the form of a tubular member 90 which extends from the interior surface of the wrap 74 to an outer longitudinal edge in order to provide an entry passageway for a sensing probe. If desired, a similarly configured tubular vent aperture (not shown) can also be provided, for example, on the opposite edge of wrap 74 from tubular member 90, to permit a small amount of air to enter the enclosure and replace the gas volume withdrawn by the sensing probe, thereby preventing the pressure within the enclosure from dropping below the atmospheric pressure.

Figure 8:
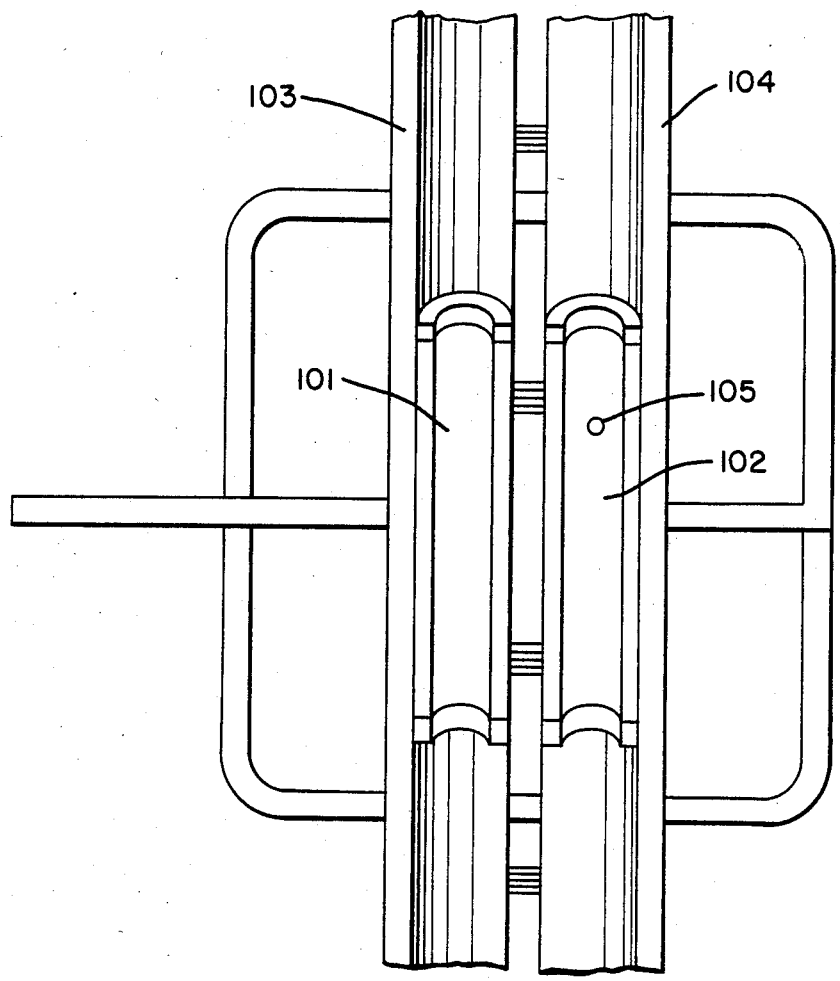
FIG. 8 is a fragmentary perspective view of a pipe section showing another form of leak test enclosure.

Another form of test enclosure is illustrated in FIG. 8. As there shown a pair of resilient, split enclosure halves 101, 102 are secured to and carried by a pair of steel outer casings 103, 104. The enclosure halves 101, 102 function in a manner similar to the embodiments of FIGS. 2–4 and include a probe aperture 105. The steel outer casings provide increased safety for those in the vicinity of the test enclosure by laterally containing any fragments or high gas pressures that might occur in the event of rupture or other failure at the joint. Locking means similar to that illustrated in FIG. 4 can be provided on casings 103, 104 to securely lock them together.

Thus it can be seen that the leak test enclosure herein described provides a rapid and secure means for enclosing a test section for confining leakage of tracer gas utilized to test for joint leakage. The device does not involve the necessity for using water for detecting gas bubbles, and therefore it is usable in even the coldest weather, when freezing of water would be a problem. It also eliminates the need to periodically replenish any water which may have been lost as a result of axial movement, relative to the pipe sections, of the previously-used bubble bucket over various enlarged areas of pipe, which can cause deflection of the bucket lower seal with consequent loss of water.

As part of the present invention, it has been discovered that helium, as the tracer or test gas, either alone or in combination with another inert gas or gases, such as nitrogen, in a gas mixture containing a critical minimum level of helium, produces unexpected results in detecting previously undetectable, very small leak passages in oil field pipe, and reduces the test time for detecting somewhat larger leak passages than previously possible with prior known pressurized gas systems. Without intending to be limited, it is believed that helium is superior to prior pressurized gas systems, particularly nitrogen used in the prior systems, for the following reasons. Methane is the principal constituent of subterranean gas, which is under high pressure within the drill string. Nitrogen has a higher molecular weight and, therefore, a higher mass than methane. Thus, when nitrogen is used as the test gas for detecting leaks in a drill pipe section, the nitrogen cannot escape from very small leak passages that might otherwise allow methane to escape, and it will flow through very small but passable leak sites at a slower rate than methane. On the other hand, helium has a lower molecular weight and, therefore, a lower mass than methane, and much lower than nitrogen. Thus, it is hypothesized that helium can detect very small leak passages, smaller than those detectable by nitrogen gas, and can detect small but passable leak sites at a more rapid rate than nitrogen, because its molecular size is smaller than methane, and much smaller than nitrogen. In other words, because helium has a lower molecular weight and, therefore, a lower mass than does methane, helium should be capable of detecting all leak sites which might pass subterranean gas (essentially methane), even leak sites that would not pass nitrogen, as well as more rapidly detecting somewhat larger leak sites which are capable of passing nitrogen, but only at a slow rate. Other gases which have similar molecular weight and mass characteristics as helium with respect to methane could be used in the present invention, such as hydrogen and oxygen, if they were not otherwise objectionable. However, neither hydrogen nor oxygen can be used in accordance with the present invention because of their combustibility in the environment in which the present invention is used. Helium gas possesses all of the necessary qualities for carrying out the present invention. Other gases that are also suitable include: ethane (3.0%), methane (5.0%), monochloromethane, fluorotrichloromethane, dichlorodifluoromethane, chlorotrifluoromethane, dichloromonobromomethane, monochlorodifluoromethane, sulfur hexafluoride, and propane (2.1%), among others, the parenthetical weight percentages given reflecting approximate maximum concentrations for safe operation.

Tests using a GOW-MAC Model No. 21-250 gas leak detector to measure leak rates through a given leak site have shown that the leak rate for helium is approximately 2.6 times that for nitrogen. Table I below presents the leakage rates which correspond with a given reading on a GOW-MAC detector for a given leak site:

TABLE I

Helium Leak Rate Comparison to Nitrogen Leak Rate and Its Detection Using a GOW-MAC Detector

| Helium Leak Rate | | Divisions of Deflection on GOW-MAC Detector (metal units) | Nitrogen Leak Rate | |
|---|---|---|---|---|
| (cm³/sec) | (ppm)* | | (cm³/sec) | (ppm)* |
| $1.1 \times 10^{-5}$ | 10 | 10 | $0.41 \times 10^{-5}$ | 3.8 |
| $2.2 \times 10^{-5}$ | 20 | 20 | $0.83 \times 10^{-5}$ | 7.6 |
| $3.3 \times 10^{-5}$ | 30 | 30 | $1.3 \times 10^{-5}$ | 11.3 |
| $4.4 \times 10^{-5}$ | 40 | 40 | $1.7 \times 10^{-5}$ | 15.0 |
| $5.5 \times 10^{-5}$ | 50 | 50 | $2.1 \times 10^{-5}$ | 19.0 |
| $6.6 \times 10^{-5}$ | 60 | 60 | $2.5 \times 10^{-5}$ | 22.6 |
| $7.7 \times 10^{-5}$ | 70 | 70 | $2.9 \times 10^{-5}$ | 26.4 |
| $8.8 \times 10^{-5}$ | 80 | 80 | $3.3 \times 10^{-5}$ | 30.2 |
| $9.9 \times 10^{-5}$ | 90 | 90 | $3.7 \times 10^{-5}$ | 34.0 |
| $11.0 \times 10^{-5}$ | 100 | 100 | $4.2 \times 10^{-5}$ | 38.0 |
| $55.0 \times 10^{-5}$ | 500 | 500 | $21.0 \times 10^{-5}$ | 190 |
| $110.0 \times 10^{-5}$ | 1000 | 1000 | $42.0 \times 10^{-5}$ | 380 |

*ppm = parts per million

It has been found that the speed of leak detection is related to the quantity of helium in a given volume of test gas, the greater the volume of helium, the quicker the response. And it has also been found that a prticular range of mixture ratios of helium to, say, nitrogen, provides as quick a response in terms of identifying a leak site, as pure helium alone, thereby permitting such tests to be performed using a smaller amount of helium.

Specifically, tests were performed using a known leakage area and subjecting it to a test gas at a given pressure to provide a constant leak rate of the test gas through the leak site. The test gas was a mixture of helium and nitrogen. The ratio of helium to nitrogen was varied and the time for the detector to achieve the maximum reading was measured. The results of that test are presented in Table II below:

TABLE II

| Helium to Nitrogen Ratio (By volume) | Leak Rate (cm³/sec) | Test Pressure (psi) | Detection Time in sec for maximum reading |
|---|---|---|---|
| 100% Helium | $1.2 \times 10^{-5}$ | 5,800 | 8 |
| 1:1 | $1.2 \times 10^{-5}$ | 5,800 | 8 |
| 1:2 | $1.2 \times 10^{-5}$ | 5,800 | 8 |
| 1:3 | $1.2 \times 10^{-5}$ | 5,800 | 8 |
| 1:4 | $1.2 \times 10^{-5}$ | 5,800 | 8 |
| 1:5 | $1.2 \times 10^{-5}$ | 5,800 | 8 |
| 1:8 | $1.2 \times 10^{-5}$ | 5,800 | 8 |
| 1:9 | $1.2 \times 10^{-5}$ | 5,800 | 10 |
| 1:10 | $1.2 \times 10^{-5}$ | 5,800 | 11 |
| 1:12 | $1.2 \times 10^{-5}$ | 5,800 | 11 |
| 1:14 | $1.2 \times 10^{-5}$ | 5,800 | 12 |

From the results presented in Table II above, it can be seen that helium to nitrogen ratios of as low as 1 part helium to 8 parts nitrogen, by volume, result in the same detection time to achieve a maximum reading on the gas detector. Ratios of 1:9 or less resulted in increased detection times to achieve the maximum reading. Additionally, in using the test gas mixtures as given above, it is preferred that the test pressure be from about 3000 psi to about 20,000 psi in order to assure detecting even the smallest leak sites within a reasonable time period, If the time involved to detect a leak is not a critical factor, test gas having even smaller concentrations of helium can be used. The following tests were conducted to permit a determination of the minimum quantity of helium in the test gas to permit a leak to be detected using the GOW-MAC instrument.

A GOW-MAC gas leak detector (Model #21-250), which detects gases based upon their thermal conductivity as compared with that of air, and a Consolidated Electrodynamics helium mass spectrometer were used to determine the minimum helium to nitrogen operating mixtures which could be detected at a fixed pressure and leak rate. The minimum absolute helium leak rate detectable by the GOW-MAC Unit and the Consolidated Electrodynamics Unit (sold by Du Pont, and henceforth referred to as the Du Pont unit) was also determined.

In performing the testing, helium and nitrogen mixtures of known concentrations were pressurized up to 5500 psig and a test section of pipe was filled with the test gas mixture at that pressure. An enclosure of the type hereinbefore described was placed around the leaking test section and readings were taken from the GOW-MAC tester 30 seconds and 60 seconds after placing the enclosure around the test section. This same procedure was repeated for the Du Pont unit. A fixed leak rate was set with a test gas mixture in which helium was present in an amount of 6.67% by weight with the balance being nitrogen. The leak rate was set so that with that concentration of helium the GOW-MAC unit displayed a scale reading of 3000 after 30 seconds. The same leak rate was used throughout the testing.

Gas mixtures of 6.7% helium and 93.3% nitrogen, by weight; 0.10% helium and 99.90% nitrogen, by weight; 0.020% helium and 99.980% nitrogen, by weight; and 0.0050% helium and 99.9950% nitrogen, by weight, were used in the tests. A calibration gas mixture including $6.65 \times 10^{-7}$ cc-atm/sec of helium was used to calibrate the Du Pont unit in order to permit a determination of the rate of helium leakage. The following equation was used to calculate the absolute helium leak rate using the Du Pont unit: Absolute helium leak rate = sensitivity of the unit X reading on the meter. The sensitivity of the Du Pont unit was determined during calibration. The meter was read at 30 seconds into the test. For a test mixture to be considered detectable, a minimum signal to noise ratio of 4 was selected, which means that the meter on each instrument must read 4 times the noise reading at maximum sensitivity in order for a leak to be considered detectable. The noise reading of each unit at maximum sensitivity was 5, so that the minimum reading on each unit for detecting a leak was 20.

The following parameters were used consistently throughout the testing:

| | |
|---|---|
| Pressure in the test section | 5500 psig |
| Temperature of pressurized gas | 77° F. (ambient) |
| Test enclosure | The embodiment of FIG. 2 |
| Maximum noise (each unit) | Reading of 5 at maximum sensitivity |
| Minimum signal to noise ratio for determining a leak | 4 |
| Times readings were taken | 30 seconds and 60 seconds |

| DU PONT UNIT | |
|---|---|
| Operating Pressure | 0.15 microns |
| Accelerating Current | 60% |
| Ionization Current | 50% |
| Calibration Mixture | $6.56 \times 10^{-7}$ cc-atm/sec helium |
| Sensitivity | As stated in each test (checked during each test) |

NOTE:
A sniffer tube was used on the Du Pont unit throughout testing.

The following tests were conducted:

| TEST #1 | | |
|---|---|---|
| Gas Mixture | 6.7 wt. % helium (33.3 mol %) 93.3 wt. % nitrogen (66.7 mol %) | |
| Sensitivity of the Du Pont Instrument | $2.73 \times 10^{-10}$ cc-atm/sec helium | |
| | Time | Reading |
| GOW-MAC Readings | 30 sec. | 3000 |
| | 60 sec. | 5000 |
| Du Pont Readings | 30 sec. | 11000 |
| | 60 sec. | 23500 |
| Absolute Helium Leak Rate | $3.00 \times 10^{-6}$ cc-atm/sec | |

| TEST #2 | | |
|---|---|---|
| Gas Mixture | 0.10 wt. % helium, (0.70 mol %) 99.90 wt. % nitrogen, (99.30 mol %) | |
| Sensitivity of the Du Pont Instrument | $2.73 \times 10^{-10}$ cc-atm/sec helium | |
| | Time | Reading |
| GOW-MAC Readings | 30 sec. | 22 |
| | 60 sec. | 38 |
| Du Pont Readings | 30 sec. | 5300 |
| | 60 sec. | 11000 |
| Absolute Helium Leak Rate | $1.16 \times 10^{-6}$ cc-atm/sec | |

| TEST #3 | | |
|---|---|---|
| Gas Mixture | 0.020 wt. % helium, (0.14 mol %) 99.980 wt. % nitrogen, (99.86 mol %) | |
| Sensitivity of the Du Pont Unit | $1.64 \times 10^{-10}$ cc-atm/sec helium | |
| | Time | Reading |
| GOW-MAC Readings | 30 sec. | 0 |
| | 60 sec. | 0 |
| Du Pont Readings | 30 sec. | 60 |
| | 60 sec. | 500 |
| Absolute Helium Leak Rate | $1.64 \times 10^{-8}$ cc-atm/sec helium | |

| TEST #4 | | |
|---|---|---|
| Gas Mixture | 0.0050 wt. % helium, (0.035 mol %) 99.950 wt. % nitrogen, (99.965 mol %) | |
| Sensitivity of the Du Pont Unit | $2.20 \times 10^{-10}$ cc-atm/sec. | |
| GOW-MAC Readings | NONE | |
| | Time | Reading |
| Du Pont Readings | 30 sec. | 21 |
| | 60 sec. | 321 |
| Absolute Helium Leak Rate | $4.62 \times 10^{-9}$ cc-atm/sec helium | |

The GOW-MAC unit displayed a reading after 30 seconds in Test #2 of 22. This is 10% above the minimum reading for accurately detecting a leak using that instrument and thus the Test #2 gas mixture (0.10 wt. % helium-99 wt. % nitrogen, 0.70 mol % helium-99.30 mol % nitrogen) is the lowest helium to nitrogen mixture accurately detectable by the GOW-MAC unit. The extra 10% provides a further safety factor. The minimum detectable helium leak rate under the Test #2 conditions is $1.16 \times 10^{-6}$ cc-atm/sec helium.

Test #4 gives the minimum helium to nitrogen mixture usable with the Du Pont unit and after 30 seconds of leaking, the instrument displayed a reading of 21. This is 5% over the minimum reading for a leak and is considered a further safety factor. Hence a mixture of 0.0050 wt. % helium-99.9950 wt. % nitrogen (0.035 mol % helium-99.965 mol % nitrogen) is considered the minimum helium to nitrogen mixture accurately detectable under operating conditions using the Du Pont unit. The minimum detectable helium leak rate under the Test #4 conditions is $4.62 \times 10^{-9}$ cc-atm/sec helium. Thus, on a volumetric basis, the minimum helium to nitrogen ratio for accurate leak detection using the GOW-MAC unit is 1:142, while that using the Du Pont unit is 1:2856.

While particular embodiments of the present invention have been illustrated and described, it will be apparent to those skilled in the art that various changes and modifications can be made without departing from the spirit and scope of the invention, and it is intended to encompass within the appended claims all such changes and modifications that fall within the scope of the present invention.

What is claimed is:

1. A method of testing for leaks in oil field pipe at a rig floor by using a single source of pressurized test gas to actuate a testing tool positioned at a pipe test section and to pressurize the pipe test section to test for leaks, said method comprising:
    (a) pressurizing a test gas comprising a mixture of a detectable quantity of helium tracer gas and a carrier gas in a ration of helium tracer gas to carrier gas greater than 1:9 by volume to a pressure of at least 3000 psi to provide said single source of pressurized test gas;
    (b) enclosing an area around the outside of the pipe to define a chamber around the pipe test section to confine a test gas therewithin;
    (c) actuating the test tool by introducing said pressurized test gas having a ratio of helium tracer gas to carrier gas greater than 1:9 by volume and at a pressure of at least 3000 psi from said single source of pressurized test gas into the test tool to seal off an internal section of pipe to form a closed volume pipe test section;

(d) introducing said pressurized test gas from said single source of pressurized test gas at substantially the same ratio of helium tracer gas to carrier gas greater than 1:9 by volume and at substantially the same pressure of at least about 3000 psi as sued to actuate said test tool into said pipe test section; and (e) sensing the presence of leaking helium tracer gas in the chamber around the outside of the pipe test section with a sensing means.

2. The method of claim 1 wherein the carrier gas is nitrogen.

3. The method of claim 1 wherein the test section is a pipe joint.

4. The method of claim 1 wherein the test gas is pressurized to its test pressure away from the rig floor by introducing a liquid under pressure into a remote tank containing the test gas.

5. The method of claim 1 wherein the ratio of helium to carrier gas in said test gas is greater than about 1:8 by volume.

6. An apparatus for testing for leaks in oil field pipe at a rig floor by using a single source of pressurized test gas to actuate a testing tool positioned at a pipe test section and to pressurize the pipe test section to test for leaks, said apparatus comprising:

(a) means for pressurizing a test gas comprising a mixture of a detectable quantity of helium tracer gas and a carrier gas in a ratio of helium tracer gas to carrier gas greater than 1:9 by volume to a pressure of at least 3000 psi to provide said single source of pressurized test gas;

(b) means for enclosing an area around the outside of the pipe to define a chamber around the pipe test section to confine a test gas therewithin;

(c) means for actuating the test tool bv introducing said pressurized test gas having a ratio of helium tracer gas to carrier gas greater than 1:9 by volume and at a pressure of at least 3000 psi from said single source of pressurized test gas into the test tool to seal off an internal section of pipe to form a closed volume pipe test section;

(d) means for introducing said pressurized test gas from said single source of pressurized test gas at substantially the same ratio of helium tracer gas to carrier gas greater than 1:9 by volume and at substantially the same pressure of at least about 3000 psi as used to actuate said test tool into said pipe test section; and (e) means for sensing the presence of leaking helium tracer gas in the chamber around the outside of the pipe test section with a sensing means.

7. An apparatus for testing for leaks in oil field pipe at a rig floor by using a single source of pressurized test gas to actuate a testing tool positioned at a pipe test section and to pressurize the pipe test section to test for leaks, said apparatus comprising:

(a) an accumulator;

(b) means for introducing a test gas comprising a mixture of helium and a carrier gas in a ratio of helium to carrier gas greater than 1:9 by volume into said accumulator;

(c) pressurization means including means to introduce liquid under pressure into said accumulator to pressurize said test gas to a pressure of at least about 3000 psi to provide said single source of pressurized test gas;

(d) means for remotely controlling the introduction of test gas and liquid into said accumulator and for controlling the flow of pressurized test gas from said accumulator;

(e) means for enclosing an area around the outside of the pipe to define a chamber around the pipe test section to confine a test gas therewithin;

(f) means for actuating the test tool by introducing said pressurized test gas at a pressure of at least 3000 psi from said single source of pressurized test gas into the test tool to seal off an internal section of pipe to form a closed volume pipe test section;

(g) means for introducing said pressurized test gas from said single source of pressurized test gas at substantially the same pressure of at least about 3000 psi as used to actuate said test tool into said pipe test section; and (h) means for sensing the presence of leaking helium tracer gas in the chamber around the outside of the pipe test section with a sensing means.

8. A method of testing for leaks in oil field pipe at a rig floor by using a single source of pressurized test gas to actuate a testing tool positioned at a pipe test section and to pressurize the pipe test section to test for leaks, said method comprising:

(a) introducing a test gas comprising a mixture of helium and a carrier gas in a ratio of helium to carrier gas greater than 1:9 by volume into an accumulator;

(b) pressurizing the test gas in the accumulator by introducing liquid under pressure into the accumulator to pressurize the test gas to a specified pressure of at least about 3000 psi to provide said single source of pressurized test gas;

(c) remotely controlling the introduction of test gas and liquid into the accumulator and remotely controlling the flow of pressurized test gas from the accmulator;

(d) enclosing an area around the outside of the pipe to define a chamber around the pipe test section to confine a test gas therewithin;

(e) actuating the test tool by introducing said pressurized test gas at a pressure of at least 3000 psi from said single source of pressurized test gas into the test tool to seal off an internal section of pipe to form a closed volume pipe test section;

(f) introducing said pressurized test gas from said single source of pressurized test gas at substantially the same pressure of at least about 3000 psi as used to actuate said test tool into said pipe test section; and (g) sensing the presence of leaking helium tracer gas in the chamber around the outside of the pipe test section with a sensing means.

* * * * *